(12) United States Patent
Hatano et al.

(10) Patent No.: US 7,880,804 B2
(45) Date of Patent: Feb. 1, 2011

(54) HIGH FREQUENCY INFORMATION DETECTING DEVICE AND IMAGING DEVICE

(75) Inventors: Toshinobu Hatano, Kyoto (JP); Yoshinori Okura, Osaka (JP)

(73) Assignee: Panasonic Corporation, Osaka (JP)

( * ) Notice: Subject to any disclaimer, the term of this patent is extended or adjusted under 35 U.S.C. 154(b) by 675 days.

(21) Appl. No.: 11/802,625

(22) Filed: May 24, 2007

(65) Prior Publication Data
US 2007/0286588 A1 Dec. 13, 2007

(30) Foreign Application Priority Data
May 26, 2006 (JP) .............................. 2006-146714

(51) Int. Cl.
*H04N 5/232* (2006.01)
*G03B 13/00* (2006.01)

(52) U.S. Cl. ...................................... 348/354
(58) Field of Classification Search .......... 348/345–357
See application file for complete search history.

(56) References Cited
U.S. PATENT DOCUMENTS

| | | | | |
|---|---|---|---|---|
| 4,985,777 A * | 1/1991 | Kawada | ...................... | 348/356 |
| 5,140,353 A * | 8/1992 | Stoneham | ..................... | 396/60 |
| 5,258,847 A * | 11/1993 | Yamada et al. | .............. | 348/356 |
| 6,417,883 B1 * | 7/2002 | Kaneda | ....................... | 348/350 |
| 6,798,455 B1 * | 9/2004 | Abe | ........................... | 348/353 |
| 6,859,619 B2 | 2/2005 | Kurosawa et al. | | |
| 7,064,759 B1 * | 6/2006 | Feierbach et al. | ........ | 345/469.1 |
| 2004/0179128 A1 * | 9/2004 | Oikawa | ..................... | 348/345 |
| 2006/0140612 A1 * | 6/2006 | Yata | ........................... | 396/124 |

FOREIGN PATENT DOCUMENTS

JP 03-096178 4/1991

* cited by examiner

*Primary Examiner*—Nhan T Tran
*Assistant Examiner*—Tuan H Le
(74) *Attorney, Agent, or Firm*—McDermott Will & Emery LLP

(57) ABSTRACT

A weighted gain generator sets a high frequency information detecting frame in an imaging screen of an image sensor, after that, sets a reference point in the high frequency information detecting frame, and sets such a weighting that has correspondence to a distance between a position of a targeted pixel in the imaging video signal and the reference point to a gain of the targeted pixel. A gain adjuster makes the gain weighted by the weighted gain generator act on the high frequency component of the imaging video signal.

10 Claims, 6 Drawing Sheets

FIG. 4
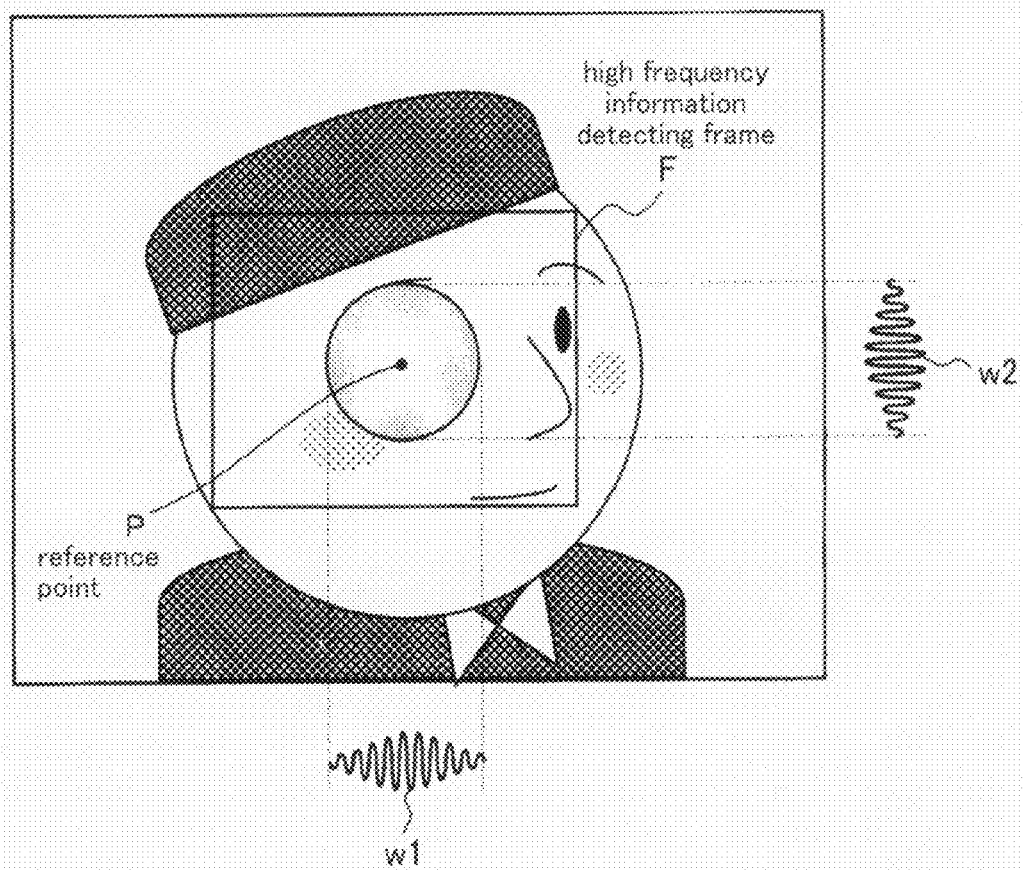
FIG. 5A   FIG. 5B   FIG. 5C
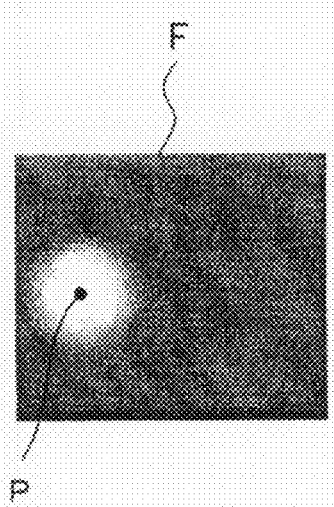
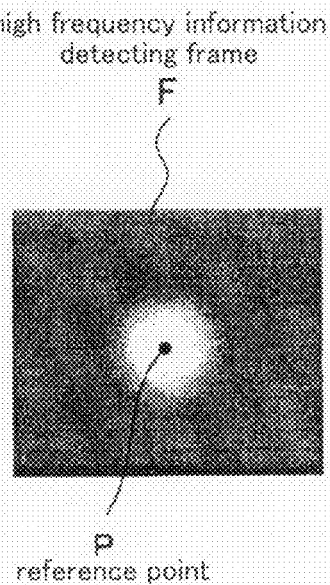
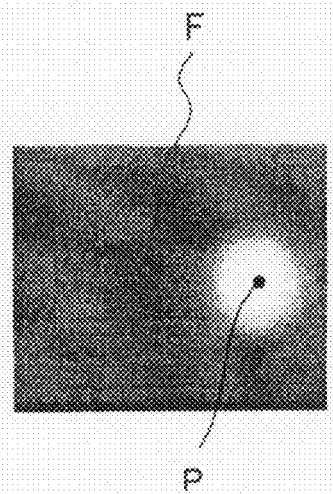

F I G. 6
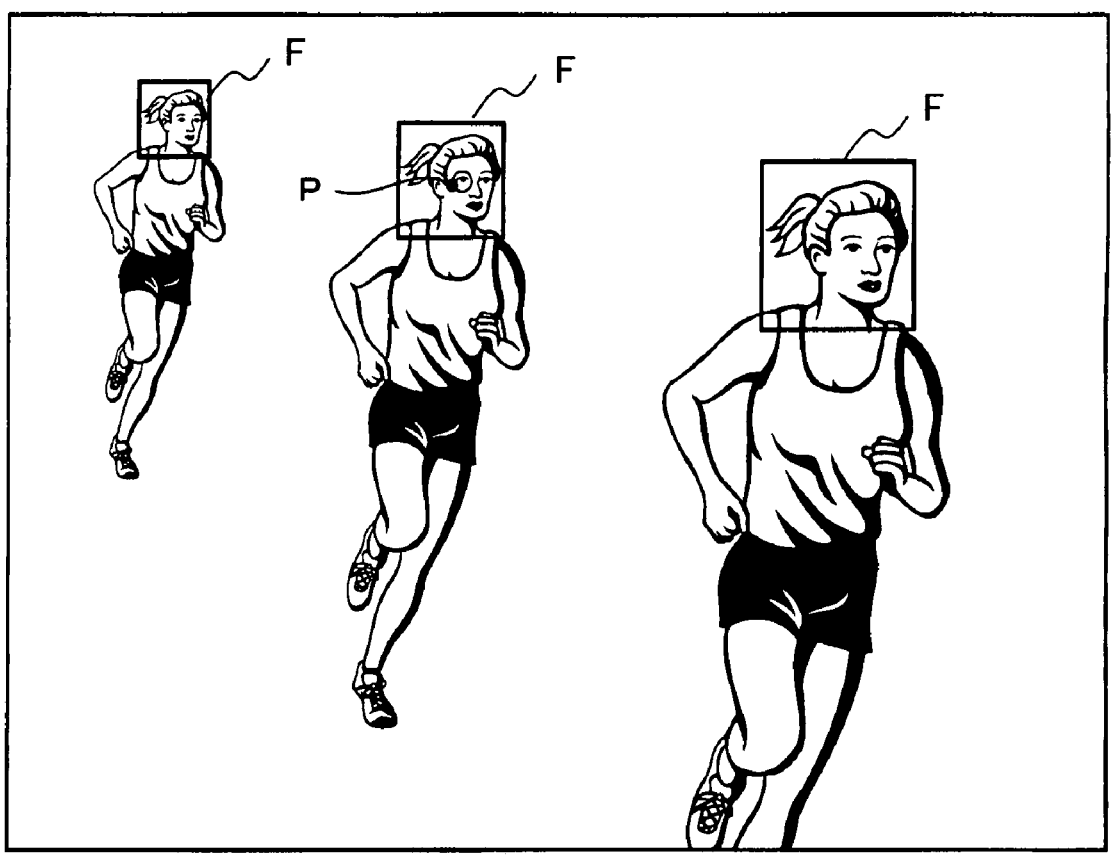

HIGH FREQUENCY INFORMATION DETECTING DEVICE AND IMAGING DEVICE

BACKGROUND OF THE INVENTION

1. Field of the Invention

The present invention relates to a high frequency information detecting device for extracting high frequency information for auto focus from an imaging video signal, and an imaging device in which the high frequency information detecting device is installed.

2. Description of the Related Art

In recent years, there are things that can be described as brilliant in the transition from the analog technology to the digital technology in the camera industry. In particular, a digital still camera, which does not demand any film and developing process, has been more actively used, and a dominant number of portable telephones available in the market are now provided with a built-in camera. An auto focus function, in which contrast of an imaging video signal is used, is also installed as part of the digital signal processing, which is significantly improving in its speed and accuracy.

As recited in No. H03-96178 of the Japanese Patent Documents, for example, such a camera that executes a signal processing for the auto focus in which the magnitude of the contrast are utilized in high frequency information of the imaging video signal in terms of cost reduction is prevailing in the market. Further, in order to realize the auto focus function in a stable manner, an auto focus device for realizing the auto focus based on the center-weighted method by dividing a screen into a plurality of regions and separately weighting each of the regions was proposed.

FIG. 7A shows a constitution of a signal processing device including a conventional high frequency information detecting device 57 of the foregoing type. In FIG. 7A, 51 denotes a pre-processor for executing the black-level correction, gamma correction, gain correction and the like to an imaging video signal from an image sensor not shown, and 52 denotes a post-processor for generating a luminance signal and a color signal from the pre-processed imaging video signal. Describing the imaging video signal recited here, it is an output of the image sensor that is de-noised, amplified and A/D-converted. The image sensor comprises a filter of the RGB (red/green/blue) Bayer array.

In the high frequency information detecting device 57, 55 denotes a low pass filter for removing color carrier information resulting from the color filter in the image sensor from the pre-processed imaging video signal, and 56 denotes a high frequency data detector for extracting high frequency information for auto focus from the signal from which the color carrier information is removed. The high frequency data detector 56 extracts the high frequency information by each of the divided regions in the screen. 58 denotes a CPU for reading the high frequency information extracted by the high frequency data detector 56 and thereby executing feedback control of a lens mechanism part. The feedback control executed then is the auto focus control. FIG. 7B shows positions of the regions in the case where the number of the regions from which the high frequency information is extracted in the screen is assumed to be three.

In the high frequency information detecting device 57, a high-frequency color carrier component is eliminated by the low pass filter 55, and a main signal of the luminance signal is generated, and then, the high frequency information is extracted with respect to each of the regions in the screen by the high frequency data detector 56. The high frequency information is detected every frame. An average of dimensions summed in the three regions is used as a dimension of the high frequency information. Farther, the plurality of regions may not be three. As the divided regions are increased, the auto focus can be more stabilized.

In the conventional high frequency information detection, however, the average of the high frequency information extracted in the plurality of regions and summed is used for the auto focus. Therefore, it becomes difficult to place the focus on one point in the region at a high speed when a person is photographed in closeup or a still subject is macro-photographed. The averaging process is effective with respect to a photographed image having a large depth of field in order to assure an accuracy in the focus accurate, however, unsuitable for achieving a high accuracy and a high speed in the auto focus in a photographed image whose depth of field is small. A possible solution is to increase the number of the regions, which, however, invites increase of a circuit area.

SUMMARY OF THE INVENTION

Therefore, a main object of the present invention is to strike a balance between a high accuracy and a high speed in the auto focus without increasing a circuit area.

1) A high frequency information detecting device according to the present invention is a high frequency information detecting device for weighting a high frequency component of an imaging video signal by an image sensor and thereafter extracting high frequency information for auto focus, comprising:

a weighted gain generator for setting a high frequency information detecting frame in an imaging screen of the image sensor, then setting a reference point in the high frequency information detecting frame and setting such a weighting that has correspondence to a distance between a position of a targeted pixel in the imaging video signal and the point and the reference point to a gain of the targeted pixel; and a gain adjuster for making the gain weighted by the weighted gain generator act on the high frequency component of the imaging video signal.

In the foregoing constitution, the number of the high frequency information detecting frame set in the imaging screen may be at least one. The reference point (central point) is set in the high frequency information detecting frame, and the weighted gain generator sets the weighting to the gain of the targeted pixel in accordance with the distance between the targeted pixel and the reference point and then transmits the weighted gain to the gain adjuster. The gain adjuster makes the gain weighted by the weighted gain generator act on the high frequency component of the imaging video signal and then outputs the gain-adjusted imaging video signal. As a final step, the high frequency information for the auto focus is extracted from the gain-adjusted imaging video signal after a color carrier component in vicinity of the Nyquist frequency due to the color filter array of the image sensor is eliminated. As a result, the auto focus can be stabilized though the number of the high frequency information detecting frame is one. When such a high frequency gain characteristic that increases the weighted gain toward the reference point in the weighted gain generator is provided, in particular, the stable auto focus of the center-weighted method can be realized. The number of the high frequency information detecting frame may be at least one. Then, the auto focus can strike a balance between a high accuracy and a high speed in close-up photographing of a person or a macro-photographing of still subject without the increase of the circuit area, for example, the increase of the divided regions.

2) In the foregoing constitution 1), there is an embodiment that the gain generator sets the high frequency information detecting frame to a fixed position in the imaging screen and sets the reference point to an arbitrary position in the high frequency information detecting frame. Thus, it becomes a standard that the high frequency information detecting frame is fixedly set, while the reference point is arbitrarily set. However, it is effective that the high frequency information detecting frame may be arbitrarily set so as to give flexibility.

3) In the foregoing constitution 1), there is an embodiment that the weighted gain generator preferably sets the weighting, that is larger as the distance between the position of the targeted pixel and the reference point is smaller, to the gain of the targeted pixel. More specifically, the weighting is made larger as the targeted pixel is closer to the reference point in both horizontal and vertical directions so that the gain at the reference point has a peak.

In the foregoing constitution 1), there is an embodiment that the gain adjuster comprises:

a band pass filter for extracting a high frequency component signal from the imaging video signal;

a gain multiplier for multiplying the high frequency component signal by the gain weighted by the weighted gain generator; and a signal adder for adding the imaging video signal to the gain-multiplied high frequency component signal. The gain adjuster like this has a function of high-frequency gain-up. The high frequency component is extracted from the imaging video signal by the band pass filter, and the high frequency component signal is multiplied by the weighted gain and added to the original imaging video signal. Therefore, variation of the luminance can be speedily grasped in the high frequency information detecting frame, which is advantageous in increasing the speed of the auto focus.

5) In the foregoing constitution 1), there is an embodiment that the weighted gain generator obtains face detection information of a photogenic subject in the imaging video signal from outside, then sets the high frequency information detecting frame in vicinity of a face position of the photogenic subject indicated by the face detection information, and sets the reference point in an arbitrary section of the face position. Herewith, through adding the face detection information to control factors in the present invention, the auto focus can be realized with respect to any arbitrary position.

6) In the foregoing constitution 1), there is an embodiment that the weighted gain generator obtains movement detection information in the imaging video signal from outside, then sets the reference point in a moving section indicated by the movement detection information, and sets the high frequency information detecting frame to a constant position. Herewith, through adding the movement detection information to the control factors in the present invention, the auto focus can be realized with respect to any arbitrary position.

7) In the foregoing constitution 1), there is an embodiment that the weighted gain generator obtains face detection information of a photogenic subject in the imaging video signal from outside, then extracts a desired face from a group of faces of the photogenic subject indicated by the face detection information in the case where the plurality of faces is included in the obtained face detection information based on the priority of face sizes, sets the high frequency information detecting frame in vicinity of a position of the extracted face, and sets the reference point to an arbitrary position in the set high frequency information detecting frame. As a result, the auto focus can be realized at the face position having the desired size.

8) An imaging device according to the present invention comprises:

an image sensor;

a pre-processor and post-processor for signal-processing an imaging video signal outputted from the image sensor; and the high frequency information detecting device recited in claim 1 for weighting the high frequency component of the imaging video signal and thereafter extracting the high frequency information for auto focus. The feedback control is executed to the lens mechanism part by means of the high frequency information obtained by the high frequency information detecting device according to the present invention so that the stable auto focus of the center-weighted method can be realized even though the number of the high frequency information detecting frame is one. The number of the high frequency information detecting frame at the time may be at least one. Then, the auto focus can achieve a high accuracy and a high speed at the same time in close-up photographing of a person or macro-photographing of a still subject is without the increase of the circuit area, for example, the increase of the divided areas.

According to the present invention wherein such a high frequency gain characteristic that increases the weighted gain toward the reference point is provided, the stable auto focus of the center-weighted method can be realized even though the number of the high frequency information detecting frame is one, and the auto focus can achieve a high accuracy and a high speed at the same time without the increase of the circuit area such as the increase of the divided areas. The constitution according to the present invention is advantageous particularly in close-up photographing of a person whose depth of field is thin or macro-photographing of a still subject. The face detection information and the movement detection information are combined so that the auto focus can be realized at any desired position.

The high frequency information detecting device according to the present invention is effective as a technology for the highly accurate and high speed auto focus in an imaging device such as a digital camera, and further, can be effectively applied to a monitor camera and a video signal processing device.

BRIEF DESCRIPTION OF THE DRAWINGS

These and other objects as well as advantages of the invention will become clear by the following description of preferred embodiments of the invention. A number of benefits not recited in this specification will come to the attention of those skilled in the art upon the implementation of the present invention.

FIG. 4 is a conceptual view with respect to a movement setup in photographing a person in the high frequency information detecting device according to the preferred embodiment.

FIGS. 5A-5C are conceptual views when a reference point is shifted and set in the preferred embodiment.

FIG. 6 is a conceptual view of auto focus in face detection.

DETAILED DESCRIPTION OF THE INVENTION

Figure 1:
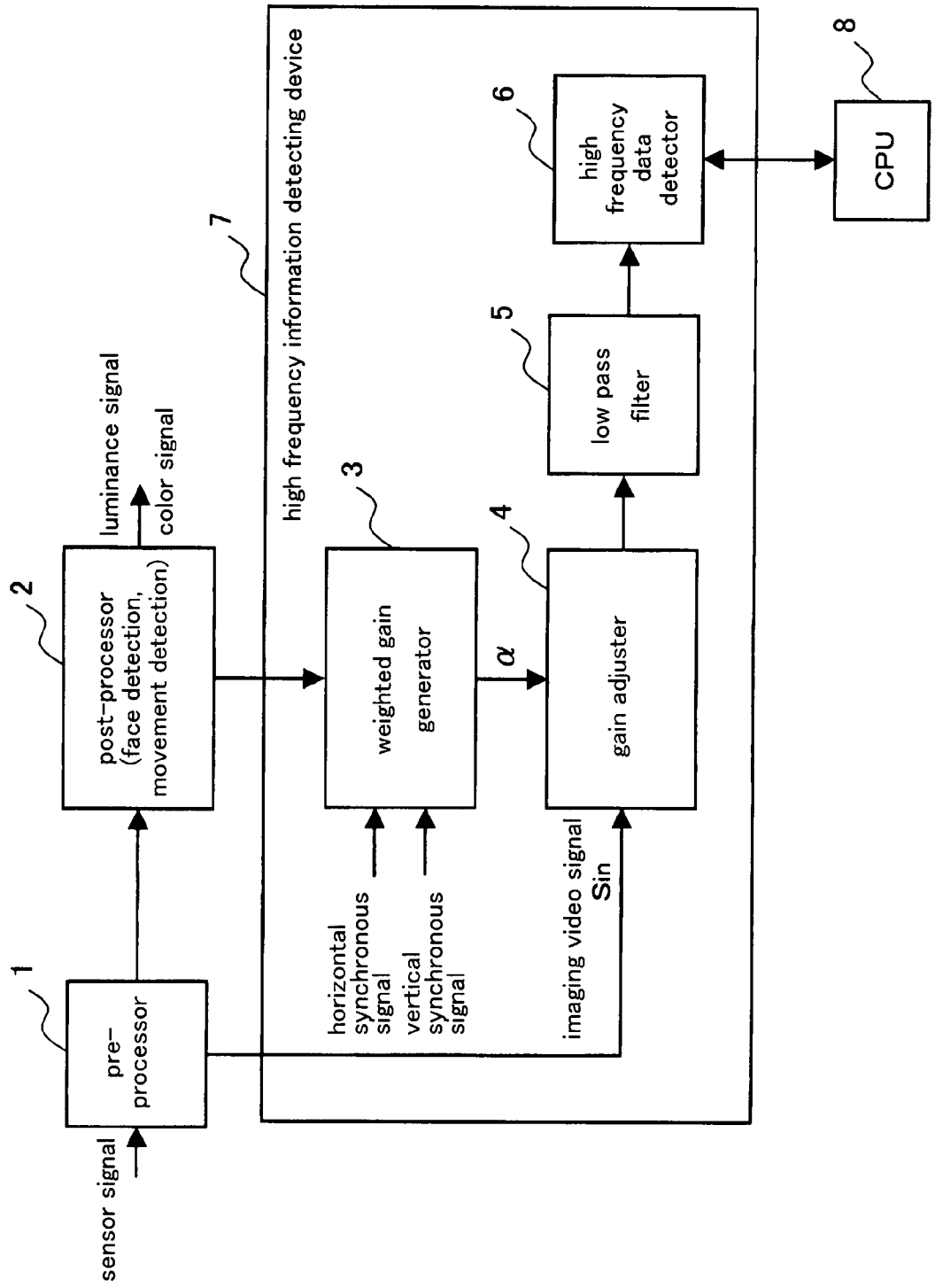
FIG. 1 is a block diagram showing a schematic constitution of a main part of an imaging device including a high frequency information detecting device according to a preferred embodiment of the present invention.
Figure 2:
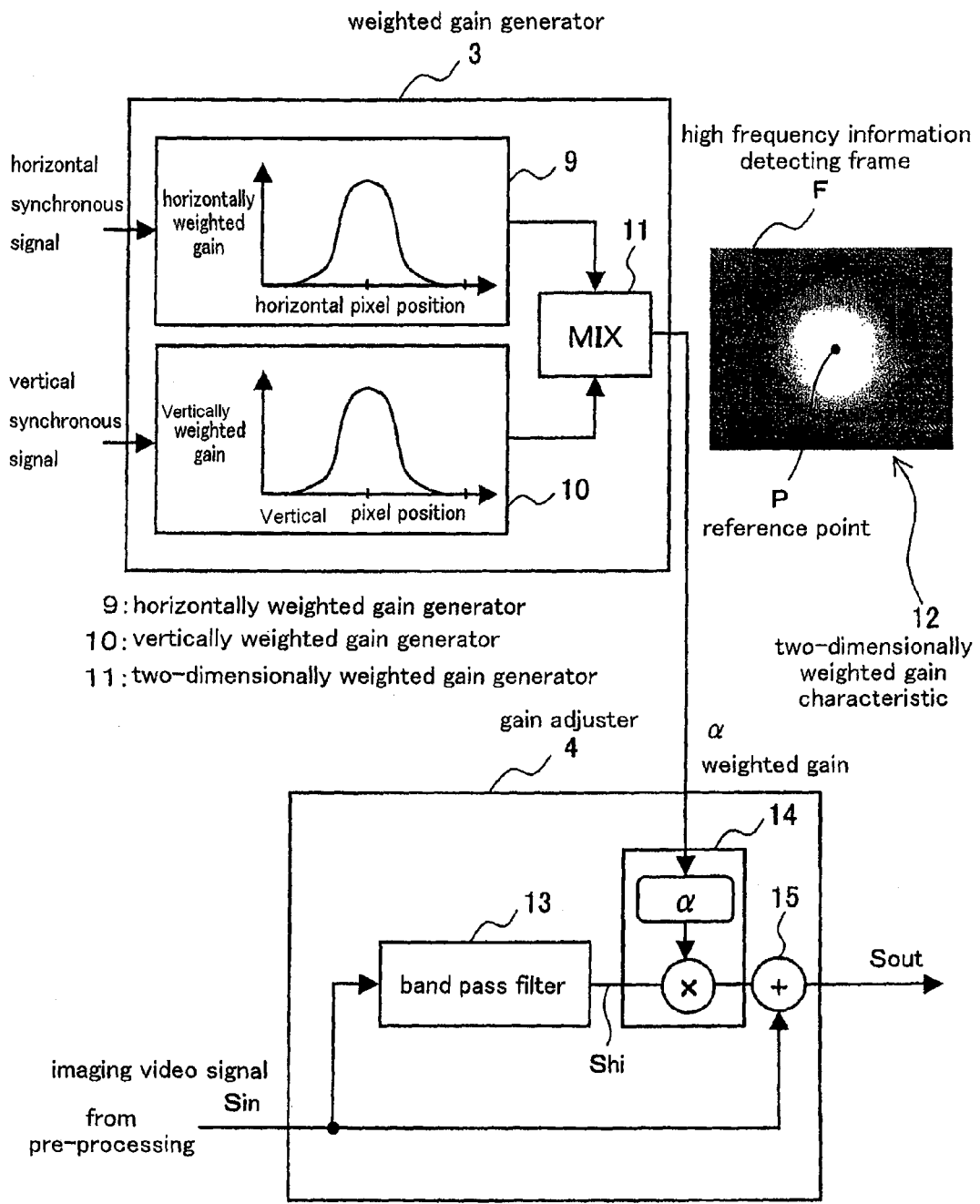
FIG. 2 is a block diagram showing detailed constitutions of a weighted gain generator and a gain adjuster according to the preferred embodiment.
Figure 3:
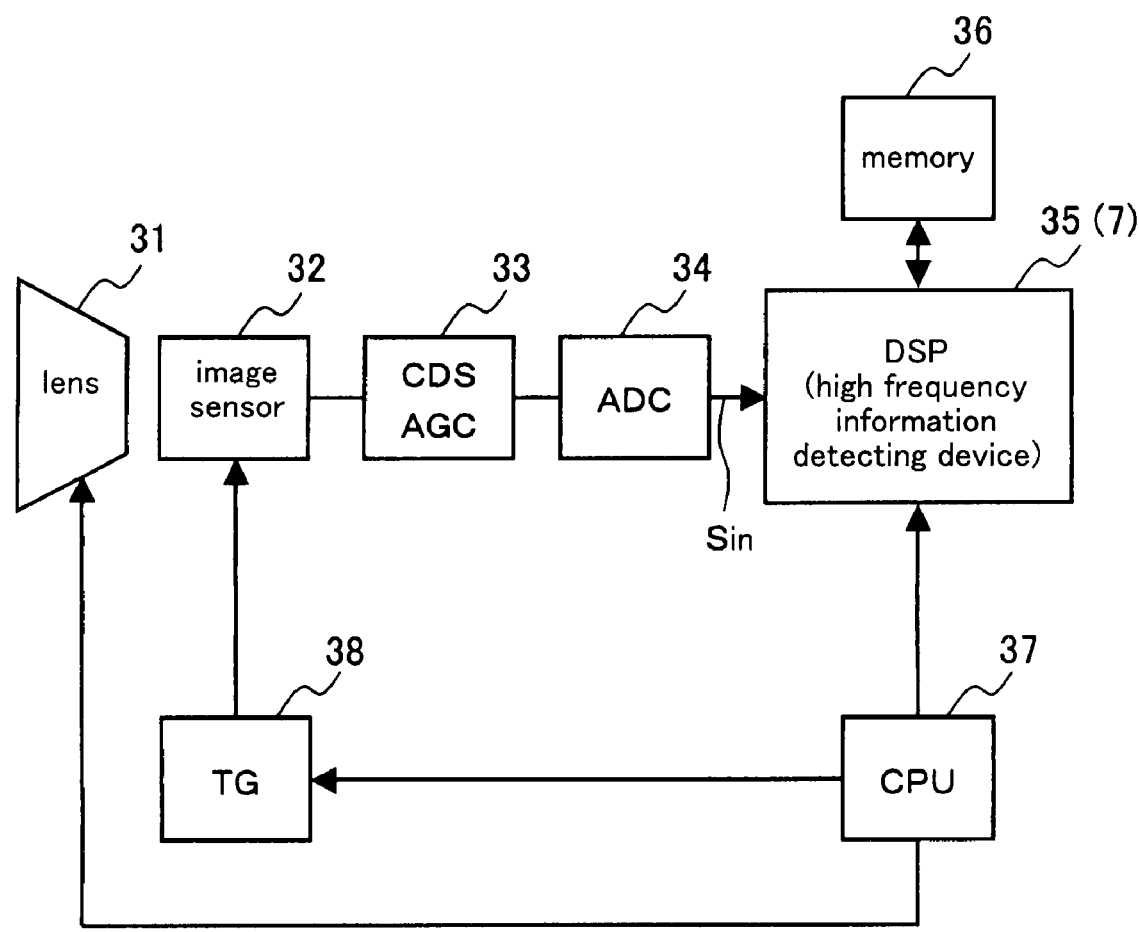
FIG. 3 is a block diagram showing a schematic constitution of the entire imaging device including the high frequency information detecting device according to the preferred embodiment.
Figure 7A:
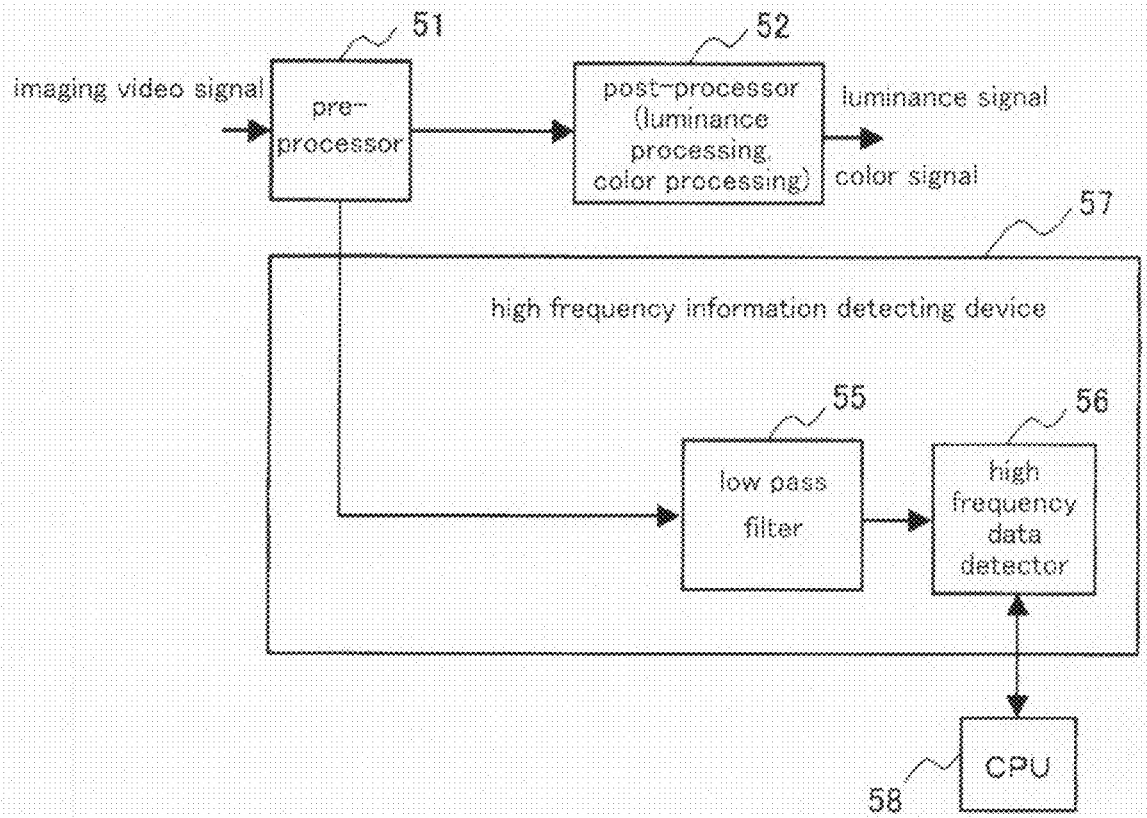
FIGS. 7A and 7B are block diagrams showing a constitution of a conventional high frequency information detecting device.
Figure 7B:
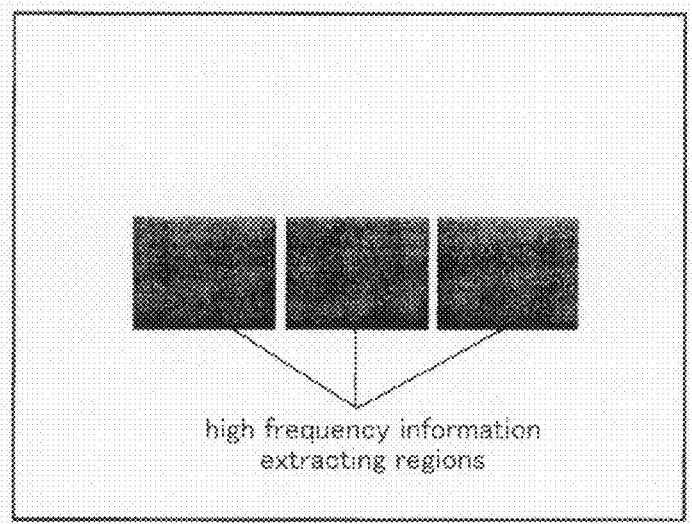

Hereinafter, a preferred embodiment of a high frequency information detecting device of the present invention is described referring to the drawings. FIG. 1 is a block diagram showing a schematic constitution of a main part of an imaging device including a high frequency information detecting device 7 according to the preferred embodiment. FIG. 2 is a block diagram showing detailed constitutions of a weighted gain generator 3 and a gain adjuster 4 in the high frequency information detecting device 7. FIG. 3 is a block diagram showing a schematic constitution of the entire imaging device including the high frequency information detecting device 7.

First, the imaging device including the high frequency information detecting device 7 is described referring to FIG. 3. Referring to reference numerals shown in FIG. 3, 31 denotes a lens mechanism part including an imaging lens, 32 denotes an image sensor, 33 denotes a CDS/AGC circuit for controlling a gain by eliminating a noise of an imaging video signal outputted from the image sensor 32, 34 denotes an A/D converter, 35 denotes a digital signal processing circuit (DSP) for performing a function to detect the high frequency information when a predetermine program is executed, 36 denotes a memory in which image data and various data are stored, 37 denotes a CPU (microcomputer) for controlling the entire imaging device, and 38 denotes a timing generator (TG) for generating a drive pulse of the image sensor 32.

Next, the high frequency information detecting device 7 is described referring to FIG. 1. Referring to reference numerals shown in FIG. 1, 1 denotes a pre-processor for executing the black-level correction, gamma correction, gain correction and the like to the signal from the image sensor A/D-converted by the A/D converter 34, 2 denotes a post-processor for detecting a face, a movement and the like by generating a luminance signal and a color signal from the imaging video signal pre-processed by the pre-processor 1, 3 denotes a weighted gain generator for generating a dual weighted gain $\alpha$ to a reference point (central point) P in a high frequency information detecting frame F from horizontal and vertical synchronous signals, 4 denotes a gain adjuster for extracting a high-frequency component of an imaging video signal Sin pre-processed by the pre-processor 1 and adding the weighted gain $\alpha$ from the weighted gain generator 3 thereto and thereby performing a high-frequency gain-up, 5 denotes a low pass filter for controlling a color carrier component in vicinity of the Nyquist frequency due to a color filter array (RGB Bayer array) of the image sensor in the imaging video signal Sin, and 6 denotes a high frequency data detector for generating a plurality of region frame signals for auto focus in one screen and extracting the high frequency information used for the auto focus by each of divided regions in the screen from the signal where the color carrier component is removed.

The high frequency information detecting device 7 comprise the weighted gain generator 3, gain adjuster 4, low pass filter 5 and high frequency data detector 6. A reference numeral 8 denotes a CPU for generating and outputting feedback information for the lens mechanism part 31. The feedback information is used to realize the auto focus by reading the high frequency information extracted by the high frequency data detector 6. The CPU 8 corresponds to the CPU 37 shown in FIG. 3.

In the weighted gain generator 3 shown in FIG. 2, 9 denotes a horizontally weighted gain generator for generating horizontally weighted gain data. In the horizontally weighted gain data, a horizontal pixel position at the reference point P in the high frequency information detecting frame F is regarded as a peak of the gain in the horizontal direction based on the inputted horizontal synchronous signal. 10 denotes a vertically weighted gain generator for generating vertically weighted gain data. In the vertically weighted gain data, a vertical pixel position at the reference point P in the high frequency information detecting frame F is regarded as a peak of the gain in the vertical direction based on the inputted vertical synchronous signal. 11 denotes a two-dimensionally weighted gain generator for outputting a two-dimensionally weighted gain $\alpha$. The two-dimensionally weighted gain $\alpha$ is generated when the two gain data generated by the horizontally weighted gain generator 9 and the vertically weighted gain generator 10 are synthesized. 12 denotes a two-dimensionally weighted gain characteristic obtained by the two-dimensionally weighted gain generator 11. In the two-dimensionally weighted gain characteristic 12, relative coordinate positions of the reference point P in the high frequency information detecting frame F can be arbitrarily set in both the horizontal and vertical directions.

In the gain adjuster 4 shown in FIG. 2, 13 denotes a band pass filter for extracting only the high frequency component from the pre-processed imaging video signal Sin. 14 denotes a gain multiplier for multiplying a high frequency component signal Shi from the bandpass filter 13 by the weighted gain $\alpha$ from the weighted gain generator 3. 15 denotes a signal adder for adding the imaging video signal Sin and a multiplication result signal (Shi×33 $\alpha$) to each other.

The high frequency component signal obtained after the imaging video signal Sin inputted to the gain adjuster 4 has passed through the band pass filter 13 is referred to as Shi. The signal resulting from the multiplication of the high frequency component signal Shi by the weighted gain $\alpha$ is Shi×$\alpha$. A signal obtained when the multiplication result signal Shi×$\alpha$ is added to the original imaging video signal Sin is Sin+Shi×$\alpha$, that is a high-frequency gain-up imaging video signal Sout (=Sin+Shi×$\alpha$). In the high-frequency gain-up imaging video signal, the multiplication result signal, Shi×$\alpha$, that is the result of the multiplication of the high frequency component signal Shi by the weighted gain $\alpha$, is laced.

Next, an operation of the imaging device including the high frequency information detecting device 7 thus constituted is described. First, an image of a photogenic subject entered via the lens of the lens mechanism part 31 is converted into an electrical signal by photodiode in the image sensor 32, and the imaging video signal, that is a continuous analog signal, is outputted by horizontal and vertical drives synchronizing with the drive pulse from the timing generator 38. The imaging video signal outputted from the image sensor 32 is automatically gain-controlled after 1/F noise is reduced to an appropriate level by a sample hold circuit (CDS) of the CDS/AGC circuit 33, and then, inputted to the A/D converter 34 and converted into the imaging video signal (RGB data) Sin that is a digital signal. The converted imaging video signal Sin is inputted to the digital signal processing circuit (DSP) 35 and subject to various processing such as a luminance signal processing, a color separating processing, a color matrix processing and the like via the memory 36.

Details of the high frequency information detecting processing are as follows. The imaging video signal Sin fetched into the digital signal processing circuit 35 is inputted to the high frequency information detecting device 7 after applying the black level, gamma and color gain adjustments thereto.

An operation of the weighted gain generator 3 in the high frequency information detecting device 7 is as follows. A photographer sets a focus point in advance. The horizontally weighted gain generator 9 detects the horizontal pixel position previously set in the high frequency information detecting frame F in synchronization with the horizontal synchronous signal, and then, generates and outputs such a horizontally weighted gain $\alpha_x$ that makes the detected horizontal pixel position a peak of the gain. The vertically weighted gain generator 10 detects the vertical pixel position previously set in the high frequency information detecting frame F in synchronization with the vertical synchronous signal, and then, generates and outputs such a vertically weighted gain $\alpha_y$ that makes the detected vertical pixel position a peak of the gain. The two-dimensionally weighted gain generator 11 synthesizes the inputted horizontally weighted gain $\alpha_x$ and vertically weighted gain $\alpha_y$, so as to generate the two-dimensionally weighted gain $\alpha$, and outputs it to the gain multiplier 14 of the gain adjuster 4. The two-dimensionally weighted gain $\alpha$ has such a gain characteristic 12 that increases the weighing as the distance between the targeted pixel position and the reference point is smaller. More specifically, the gain characteristic 12 is such a two-dimensionally weighted gain characteristic that makes a center of a circle set in the gain of the targeted pixel to a maximum gain.

In the gain adjuster 4, the imaging video signal Sin preprocessed by the pre-processor 1 is inputted to the band pass filter 13, and the obtained high frequency component signal Shi is outputted to the gain multiplier 14. In the gain multiplier 14, the high frequency component signal Shi is multiplied by the weighted gain $\alpha$ from the weighted gain generator 3, and the multiplication result signal showing the multiplication result, which is Shi×$\alpha$, is outputted to the signal adder 15. The signal adder 15 outputs Sin+Shi×$\alpha$ obtained by adding the multiplication result signal Shi×$\alpha$ to the original imaging video signal Sin to the low pass filter 5 for removing the color carrier in the next stage as the high-frequency gain-up imaging video signal Sout. Thus, the high frequency component of the broadband digital luminance signal is emphasized.

In the low pass filter 5, the color carrier component in vicinity of the Nyquist frequency due to the color filter array (RGB Bayer array) of the image sensor is controlled, and contrast information reflecting the luminance information is generated and outputted to the high frequency data detector 6. The high frequency data detector 6 generates a plurality of region frame signals for the auto focus in one screen and extracts the high frequency information in the frames. The CPU 8 reads the high frequency information extracted in the plurality of frames and thereby adjusts movement of a focus adjusting lens of the lens mechanism part 31, and then, executes the feedback control so that the high frequency information extracted in the next frame can be maximized.

FIG. 4 shows a state where the high frequency information detecting frame F is set to a face part in photographing a person and the reference point P is set to the right eye. In the two-dimensionally weighted gain characteristic 12, w1 denotes gain information in the horizontal direction, while w2 denotes gain information in the vertical direction. The gain information is both weighted so that the gains thereof are increased toward the center. In the auto focus, the high frequency information of the luminance in vicinity of the right eye set at the reference point P is emphasized and amplified, and then extracted. The gain adjuster 4 utilizes such a two-dimensionally weighted gain characteristic 12 that the weighted gain $\alpha$ is increased toward the reference point P in order to perform the gain-up of the high frequency component of the imaging video signal Sin, and thereafter the high frequency data detector 6 extracts the high frequency information for the auto focus. Therefore, the auto focus of the center-weighted method can be realized even though the number of the high frequency information detecting frame F is one. More specifically, the auto focus can strike a balance between a high accuracy and a high speed in close-up photographing of a person or macro-photographing a still subject without the increase of the circuit area such as the increase of the divided areas.

Thus, the reference point p is arbitrarily set within the high frequency information detecting frame F set in one screen in the previous stage of the low pass filter 5 and the high frequency data detector 6 in the high frequency information detecting device 7. Then, the high frequency gain characteristic of the high-frequency gain-up imaging video signal Sout to the imaging video signal Sin is changed in such a manner that is increased toward the reference point P. Thereby, the stable auto focus of the center-weighted method can be realized within at least one high frequency information detecting frame. Further, the auto focus can be realized in combination with the face detection information. Further, the auto focus can achieve a high accuracy and a high speed at the same time while preventing the increase of the circuit area such as the increase of the divided areas.

Additionally, as shown in FIGS. 5A-5C, it is possible that the position of the one high frequency information detecting frame F is fixed, and the reference point P is moved based on movement detection information from the post-processor 2. In this case, information of a position and a size of the face may be obtained in the face detection so that the reference point p is automatically set to the face part with the CPU 8. In this manner, the auto focus can be realized in combination with the movement detection information, which is particularly effective as a monitor camera.

Furthermore, in the case where there is a plurality of face detection information in one screen as shown in FIG. 6, the following response is possible based on the ranking of the sizes in the face detection information. The face-selection ranking information, that is selected by the photographer to decide to what number of the face sizes in the plurality of face detection information detected in one screen the reference point adapts, is previously registered. The weighted gain generator 3 prioritizes the faces from the larger size with respect to the plurality of face detection information when the plurality of face detection information are received from the post-processor 2, selects the face detection information that matches the face-selection ranking information previously registered, and moves the high frequency information detecting frame F to the vicinity of the selected face position. Then, the reference point P is automatically set to any arbitrary section in the face of the photogenic subject image inside the high frequency information detecting frame F. Herewith, out of the plurality of faces in one screen, the auto focus can be carried out at the face position of the desired face size. For example, when a plurality of marathon runners is photographed in the direction where they are running, the reference point can be set to (face of) any runner of the desired ranking.

The different face sizes in one screen are generated mainly from distances from the imaging device to the respective faces that is a photogenic subject. It is described above that the face-selection ranking information and the face detection information are both set from the larger size in the present preferred embodiment, however, it is needless to say that it may be set from the smaller size.

Though preferred embodiments of this invention has been described in detail, it will be understood that various modifications may be made therein, and it is intended to cover in the appended claims all such modifications as fall within the true spirit and scope of this invention.

What is claimed is:

1. A high frequency information detecting device for weighting a high frequency component of an imaging video signal obtained by an image sensor and thereafter extracting high frequency information for auto focus, the device comprising:
    a weighted gain generator for setting a reference point in a high frequency information detecting frame after setting the high frequency information detecting frame in an imaging screen of the image sensor, and generating a two dimensional weighted gain for pixels in the high frequency information detecting frame, the two dimensional weighted gain having a circular characteristic in which, for any pixel in the high frequency information detecting frame, a weight for the pixel in the high frequency information detecting frame becomes larger as the distance between the pixel and the reference point becomes smaller, and the reference point has the highest weight in the high frequency information detecting frame; and
    a gain adjuster for making the gain weighted by the weighted gain generator act on the high frequency component of the imaging video signal.

2. The high frequency information detecting device as claimed in claim 1, wherein
    the gain generator sets the high frequency information detecting frame to a fixed position in the imaging screen and sets the reference point to an arbitrary position in the high frequency information detecting frame.

3. The high frequency information detecting device as claimed in claim 1, wherein
    the gain adjuster comprises:
    a band pass filter for extracting a high frequency component signal from the imaging video signal;
    a gain multiplier for multiplying the high frequency component signal by the gain weighted by the weighted gain generator; and
    a signal adder for adding the imaging video signal to the high frequency component signal after gain-multiplication.

4. The high frequency information detecting device as claimed in claim 1, wherein
    the weighted gain generator obtains face detection information of a photogenic subject in the imaging video signal from outside so as to set the high frequency information detecting frame in vicinity of a face position of the photogenic subject indicated by the face detection information, and then sets the reference point in an arbitrary section of the face position.

5. The high frequency information detecting device as claimed in claim 1, wherein
    the weighted gain generator obtains movement detection information in the imaging video signal from outside so as to set the reference point in a moving section indicated by the motion detection information, and sets the high frequency information detecting frame to a predetermined position.

6. The high frequency information detecting device as claimed in claim 1, wherein
    the weighted gain generator obtains face detection information of a photogenic subject including a plurality of faces of the photographic subject in the imaging video signal from outside, after obtaining the face detection information, extracts a desired face from plurality of faces of the photogenic subject indicated by the face detection information based on priority of face sizes, sets the high frequency information detecting frame in vicinity of a position of the extracted face, and sets the reference point to an arbitrary position in the set high frequency information detecting frame.

7. An imaging device comprising:
    an image sensor;
    a pre-processor and a post-processor for signal-processing an imaging video signal outputted from the image sensor; and
    the frequency information detecting device recited in claim 1 for weighting the high frequency component of the imaging video signal and thereafter extracting the high frequency information for auto focus.

8. The high frequency information detecting device as claimed in claim 1, wherein the weighted gain generator is configured to generate a horizontal weighted gain and a vertical weighted gain, and generates the two dimensional weighted gain by synthesizing the horizontal weighted gain and the vertical weighted gain.

9. The high frequency information detecting device as claimed in claim 1, wherein the gain generator is configured to set the reference point to an arbitrary position in the high frequency information detecting frame.

10. The high frequency information detecting device as claimed in claim 1, wherein the gain generator is configured to set only one reference point in the high frequency information detecting frame.

* * * * *